(No Model.)

A. BECKER.
ANIMAL TRAP.

No. 352,800. Patented Nov. 16, 1886.

WITNESSES:
Fred G. Dieterich
P. B. Turpin

INVENTOR:
A. Becker
BY Munn & Co
ATTORNEYS.

N. PETERS, Photo-Lithographer, Washington, D. C.

UNITED STATES PATENT OFFICE.

ALPHONZO BECKER, OF WATERFORD, PENNSYLVANIA, ASSIGNOR TO BECKER, SKINNER & CO., OF SAME PLACE.

ANIMAL-TRAP.

SPECIFICATION forming part of Letters Patent No. 352,800, dated November 16, 1886.

Application filed June 8, 1886. Serial No. 204,531. (No model.)

*To all whom it may concern:*

Be it known that I, ALPHONZO BECKER, of Waterford, in the county of Erie and State of Pennsylvania, have invented a new and useful Improvement in Animal-Traps, of which the following is a specification.

This invention is an improvement in animal-traps; and it consists in certain features of construction and novel combinations of parts, as will be described.

Figure 1:
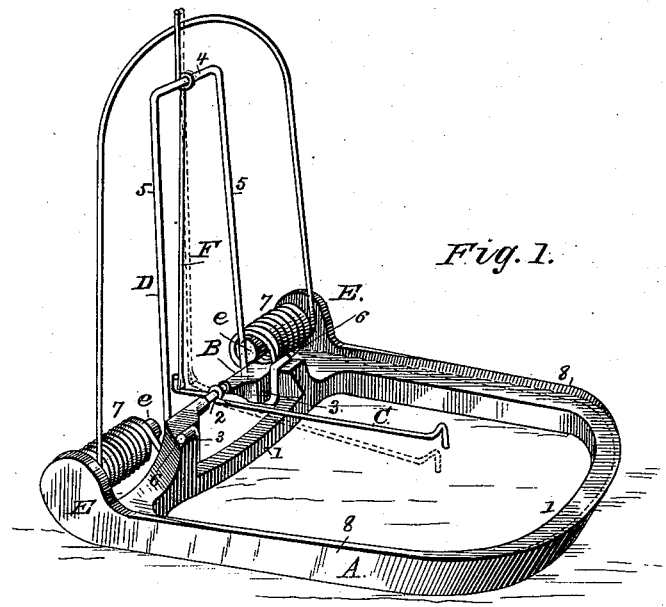
Figure 2:
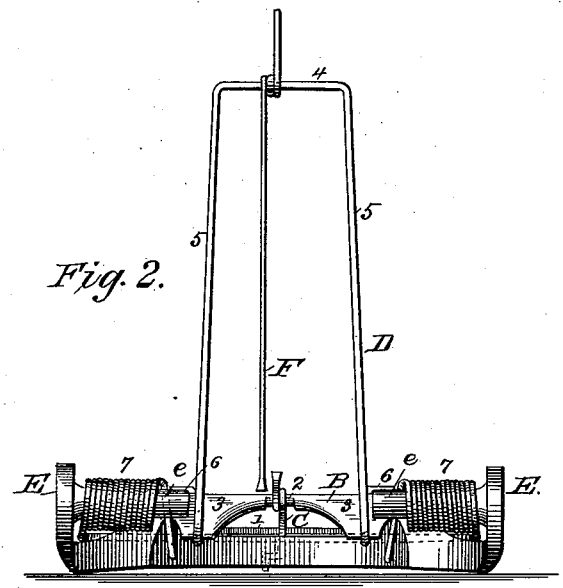
Figure 3:
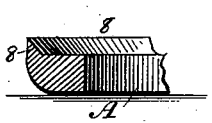

In the drawings, Figure 1 is a perspective view of the trap, shown set in full lines and sprung in dotted lines. Fig. 2 is a rear elevation of the trap. Fig. 3 is a cross-section of the base.

The base A is formed with the arch-shaped portion 1, having its arms connected near its rear end by a cross-bar, B. This bar B is formed with a bearing, 2, for the trigger C, and is provided on opposite sides of said bearing with portions 3, adapted to receive and support the uprights of the standard D. This standard is formed, preferably, of wire bent to form the cross-bar 4 and the uprights 5. These uprights are carried down in rear of the cross-bar B, bent below and up along the front side of such cross-bar, and have their ends extended at 6 laterally along and rested upon the top of the cross-bar. This extension of the ends or extremities 6 is preferred, for the reason that thereby the standard is braced against any lateral deflection or displacement. I provide the base with extensions E, projected in rear of the cross-bar, and having at or near their ends studs *e* for the spring-coils of the trap-bail. The ends of this bail are coiled at 7 on the studs *e*, and have their extremities carried under or engaged against the cross-bar, as shown. The main portion of this bail projects in front of the cross-bar, and when in front thereof rests flat against the arch of the base. This arch is provided with an upwardly-projected edge-like rib, 8, which is sharpened to or formed with a comparatively keen edge, and the base is depressed adjacent the rib, into which recess the bail enters when the trap is sprung, the base wall of said depression or recess forming a bearing for the bail.

The trigger C has its forward end adapted to receive the bait, being preferably bent downward thereat, so that the bait cannot be drawn up off the trigger without operating the trigger to release the trip-lever F. This trip-lever F is pivoted on the standard, and has one end arranged to engage the spring-bail, while its other end may be engaged and held by the rear extension of the trigger when the trap is set, and will be released therefrom in springing the trap.

By projecting the studs *e* inward toward each other, the arch-shaped bail, whose ends are coiled on these studs, has such ends stopped by the base constituting the support thereof from moving outward off the latter. This outward movement or tension is the one naturally given said ends by the spring of the bail, so that the bail, because of the arrangement shown and described, is practically self-retaining.

Having thus described my invention, what I claim as new is—

1. In a trap, the combination of the base having an edge-like rib and provided alongside of and below said rib with a bearing for the bail, the spring-actuated bail movable alongside of said rib and to and against the bearing, and trip-mechanism, substantially as set forth.

2. In a trap, the combination, with a base having studs projected inwardly toward each other, of the arch-like bail, the ends of which are coiled on the said stud and have an outward tension, all being arranged substantially as described, whereby the said bail will be self-retaining on its supporting-studs, substantially as set forth.

3. The combination, with the base having a cross-bar and trip mechanism, of the standard formed of wire having its arms bent around the cross-bar and having the extremities or ends of said arms bent and extended laterally along the cross-bar, substantially as set forth.

4. The improved trap, substantially as herein described, consisting of the base having an edge-like rib and provided with a cross-bar and with extensions in rear of such cross-bar having lateral studs, the bail having its ends wound on said studs, the standard formed of wire and having its arms bent around the cross-bar and their extremities extended laterally, the trigger pivoted to the cross-bar, and the trip-lever pivoted to the standard, substantially as set forth.

ALPHONZO BECKER.

Witnesses:
G. A. ALLEN,
MAY BUSH.